No. 864,089. PATENTED AUG. 20, 1907.
A. L. FINNELL.
WHEEL FOR VEHICLES.
APPLICATION FILED DEC. 30, 1906.
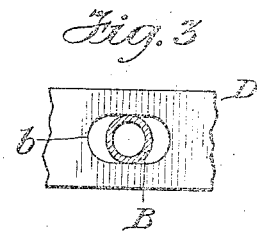
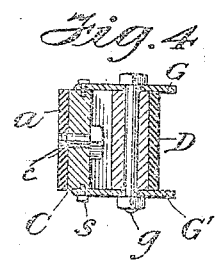
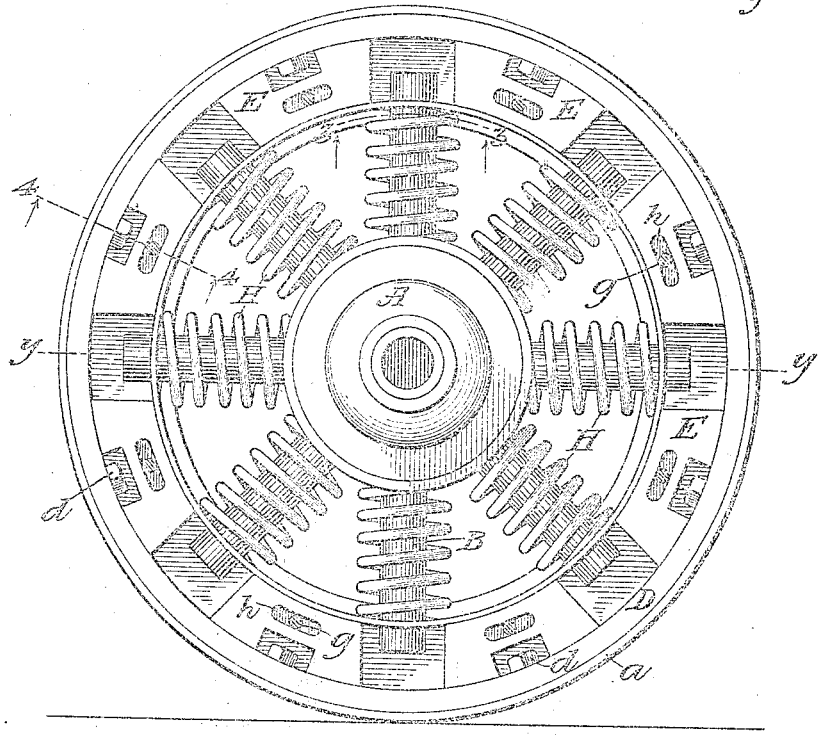
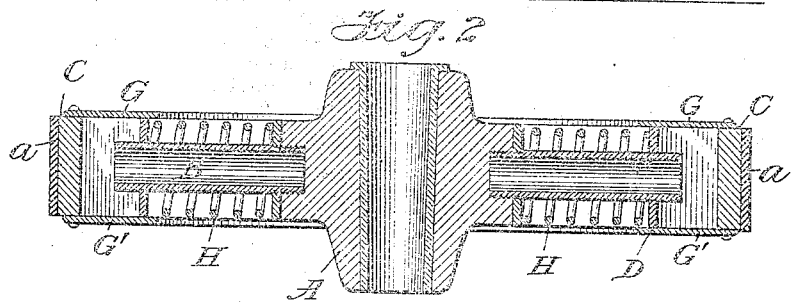

UNITED STATES PATENT OFFICE.

AIRRY L. FINNELL, OF NEW YORK, N. Y.

WHEEL FOR VEHICLES.

No. 864,089.

Specification of Letters Patent.

Patented Aug. 20, 1907.

Application filed December 30, 1905. Serial No. 294,011.

*To all whom it may concern:*

Be it known that I, AIRRY L. FINNELL, a citizen of the United States, residing in the city of New York, county of New York, and State of New York, have made certain new and useful Improvements in Wheels for Vehicles; and do hereby declare that the following specification is a full and clear description thereof.

The invention relates to that class of wheels required for heavy carriages which travel at a high rate of speed and the improvements consist in a novel construction of spokes and rims.

The object of the invention is to obtain great elasticity between the outer rim and hub, without relying on a tire liable to injury from contact with the road bed or objects on the road bed.

The construction comprises a series of spokes held firmly in the hub, but loosely attached to the rim; spiral springs surrounding the spokes rest on the hub and support the rim. The rim is also composite with spacing blocks so arranged as to permit the spokes to slide through openings in the inner section, all of which will appear by reference to the drawings.

My invention is designed to remove the resilient medium employed on wheels from the circumference to a point between the rim and hub.

In the drawings Figure 1 is a face view with the rim covering plate removed. Fig. 2 is a cross section on the line *y—y* of Fig. 1. Fig. 3 is a view of a portion of the inner rim and section of spoke taken at 3—3 of Fig. 1 with the spring omitted. Fig. 4 is a cross section of the rim at 4—4.

A, is the hub into which the spokes B, B, are screwed or otherwise secured.

C, is the outer rim on which may be used a tire *a*. The outer tire *a*, is not a necessity but desirable, and may be of any suitable material either elastic or metal.

D, is an inner rim through which the spokes B, project. The holes *b*, in the inner rim are made oblong to permit of a lateral movement therein of the spokes B, as shown in Fig. 3. Between the outer rim C, and the inner rim D, are spacing blocks E, which are closed in by the covering plates G, G', one of such plates on each side. These covering plates extend in a circle around the wheel and are secured to the rim C. They are of sufficient width to extend past the rim D, and inclose the spacing blocks between the rim as shown in Fig. 4.

H, H, are spiral springs which surround the spokes B, one end of such springs resting on the hub and the other on the rim D.

The outer tire *a*, may be secured to the outer rim C, by a screw bolt *c*; the spacing blocks E, are recessed or cut away to permit of the bolt head *d*, being housed loosely therein. This construction will permit a certain amount of circumferential movement of the spacing blocks E, to facilitate the operation of the other parts of the wheel.

The covering plates G, G, may also be secured to each other by bolts *g*, *g*, which pass through oblong slots *h*, in the spacing blocks.

The springs H, H, are secured at their ends to the inner rim and to the face of the hub in any desired manner.

I prefer to use stiff spiral springs of steel but do not wish to limit myself to any particular class of springs, as in some cases rubber may be used with good effect or a combination of rubber and spiral spring.

Claims.

1. A wheel for vehicles comprising a series of radial spokes secured to a central hub and projecting through a surrounding inner rim, into a space between said inner rim and an outer tire rim, and movable spacing blocks between the inner and outer rims said spokes being provided with surrounding springs between the hub and inner rim, substantially as shown and described.

2. In a wheel for vehicles an outer and inner rim separated by movable spacing blocks, combined with spokes projecting through the inner rim said inner rim being supported on springs resting on the hub substantially as shown and described.

3. A wheel for vehicles comprising a hub, radial spokes, an inner rim through which said spokes pass, an elastic medium between the inner rim and hub, supporting said inner rim and an exterior tire bearing rim supported on the inner rim by movable spacing blocks, substantially as shown and described.

A. L. FINNELL.

Witnesses:
   IDA RELKIN,
   SOL. BAYLINSON.